United States Patent Office 2,945,403
Patented July 19, 1960

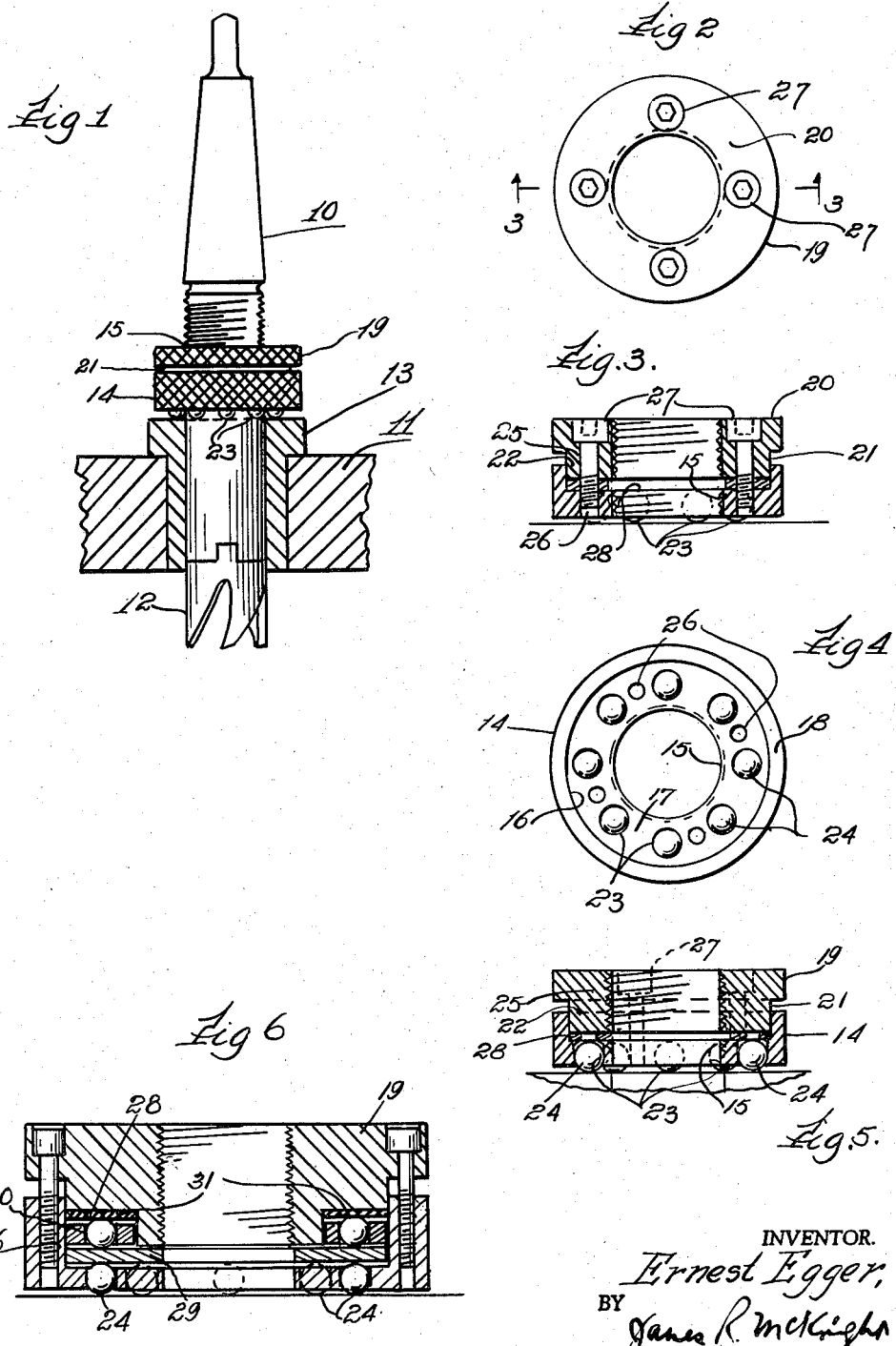

2,945,403
FRICTIONLESS STOP COLLAR FOR THE ARBOR OF A DRILL PRESS OR OTHER MACHINES

Ernest Egger, 404 Illinois St., Joliet, Ill.

Filed Feb. 19, 1958, Ser. No. 716,089

1 Claim. (Cl. 77—55)

The present invention relates to a frictionless stop collar attachable to the arbor of a drill press or similar machines to insure uniform cutting depth of the cutter.

Heretofore it has been common in the art to use a solid stop collar and locknut. The heat set up in operation due to broad bearing surfaces contacting each other causes the metal in the collars to melt slightly and flow into blisters thereby destroying the accurate depth movement intended. Precise and uniform successive cuts were out of the question, due to these ruptures in the old style type of collar.

It is among the objects of my invention to solve the foregoing problems and eliminate blistering and consequent irregularity in the cutting depth. In my construction balls are used which prevent friction and consequent blistering and insure regular depth movement resulting in desired cutting uniformity to precise standards. My construction is long-lasting in wear and very economical. There is increased ease of movement without heat. The reduced contact surface does not generate excessive heat under normal use thereby resulting in a big saving in machine tool failures.

My invention also comprises such other objects, advantages and capabilities as will later more fully appear, and which are inherently possessed by my invention.

While I have shown in the accompanying drawings preferred embodiments of my invention, yet it is to be understood that the same are susceptible of modification and change without departing from the spirit of my invention.

Referring to the drawings, Fig. 1 is an elevational view of my device on an arbor; Fig. 2 is a top plan view of my ball bearing collar; Fig. 3 is a detailed sectional view on line 3—3 of Fig. 2; Fig. 4 is a top plan view of my collar with the plate removed; Fig. 5 is a detailed sectional view of my collar with the plate in position and Fig. 6 is an enlarged detailed view of a modified form of my collar.

In a drill press, an arbor 10 extends through a fixture component 11 supporting a piece part and has removably attached to its lower end a cutting member or cutter 12. Supported on top of fixture component 11 is a drill bushing 13 surrounding arbor 10 which serves as a piloting means for the arbor.

In combinatoin with the foregoing, the embodiment selected to illustrate my invention comprises a frictionless stop collar 14 having a center screw threaded opening 15 for attachment to the arbor 10.

My collar 14 has a hollow body portion 16 with a marginal flat bottom 17 and a surrounding wall 18. A cap 19 has a rounded top portion 20 and a reduced rounded interior portion 21 with its wall 22 adapted to engage the inside of wall 18 of body portion 16.

Said flat bottom 17 has a plurality of spaced holes 23 with each hole having a ball 24 rotatable therein. Said cap 19 and said body portion 16 have a plurality of spaced registering screwthreaded holes 25 and 26 adapted to receive screws 27 therethrough for removably attaching the cap to the body portion. Balls 24 extend partly through holes 23 and rotate on the top surface of drill bushing 13 and may be contacted above by plate or washer 28.

In another embodiment shown in Fig. 6, I provide the body portion 16 with a washer 29 mounted on top of balls 24. Above washer 29 is a race 30 having a plurality of balls 31, which are contacted by plate or washer 28. Washer 29 may be more correctly termed a spacer washer.

Having thus described my invention, I claim:

In combination with a drill press having a fixture component, a piece part supported on the fixture component, a cutter removably attached to the lower end of the piece part, an arbor extending through the fixture component, and a drill bushing surrounding the arbor and supported on top of the fixture component, a frictionless stop collar comprising a hollow body member with a central screw threaded opening for removable attachment to the arbor, said body member having a flat bottom portion and a surrounding wall, said bottom portion having a plurality of spaced holes, a like number of balls rotatably mounted in said bottom portion with one ball extending partially through each hole, a plate positioned in said hollow body member on top of said balls, a cap removably engaging said body member, a plurality of screws extending into and between said cap and said body member for removably attaching them together, said collar movable with the arbor and said balls rotatable on the top surface of the drill bushing.

References Cited in the file of this patent

UNITED STATES PATENTS

| | | |
|---|---|---|
| 2,744,424 | Fisher | May 8, 1956 |
| 2,823,563 | Nipken | Feb. 18, 1958 |

FOREIGN PATENTS

| | | |
|---|---|---|
| 118,177 | Great Britain | Aug. 22, 1918 |